UNITED STATES PATENT OFFICE.

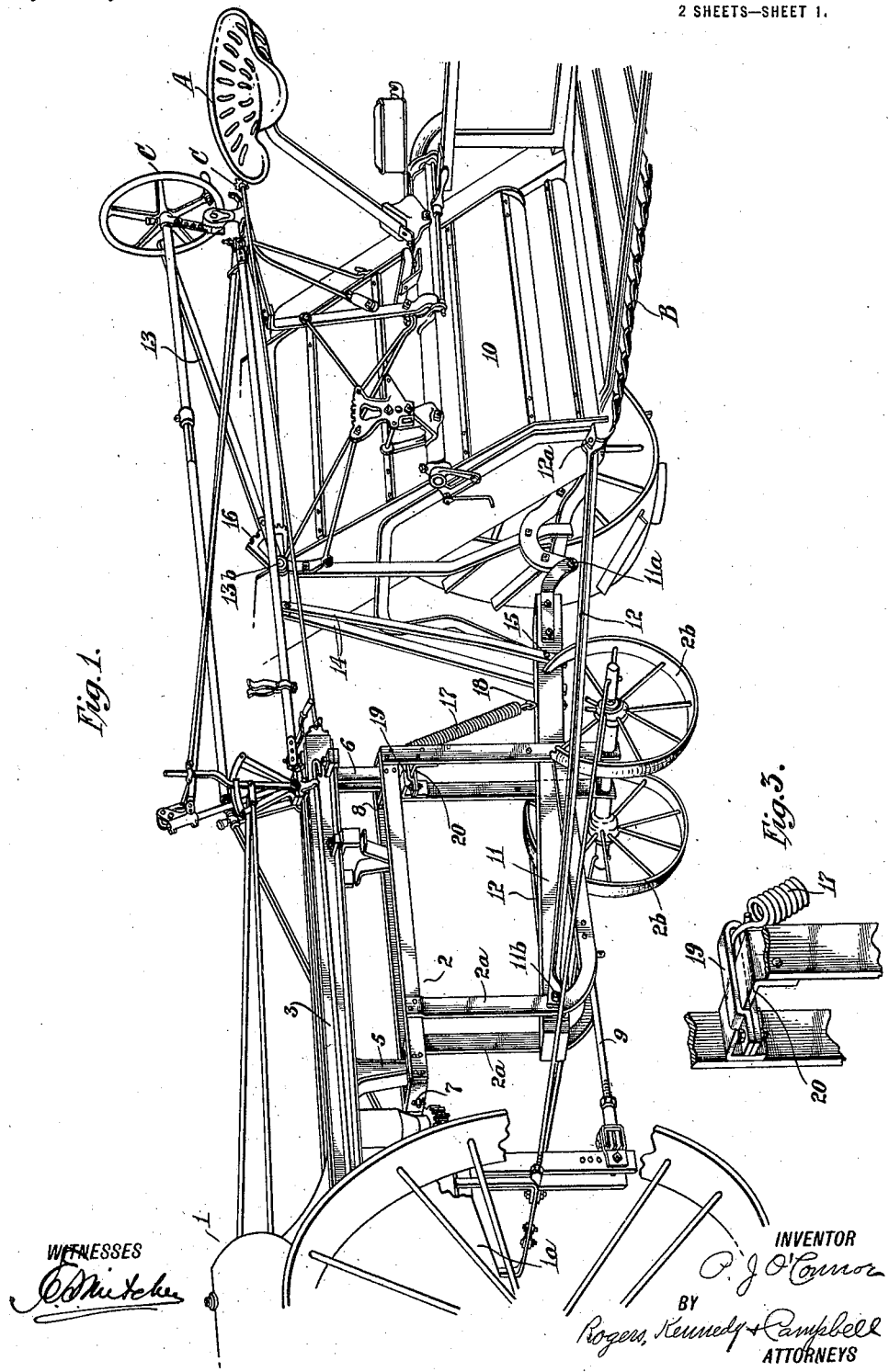

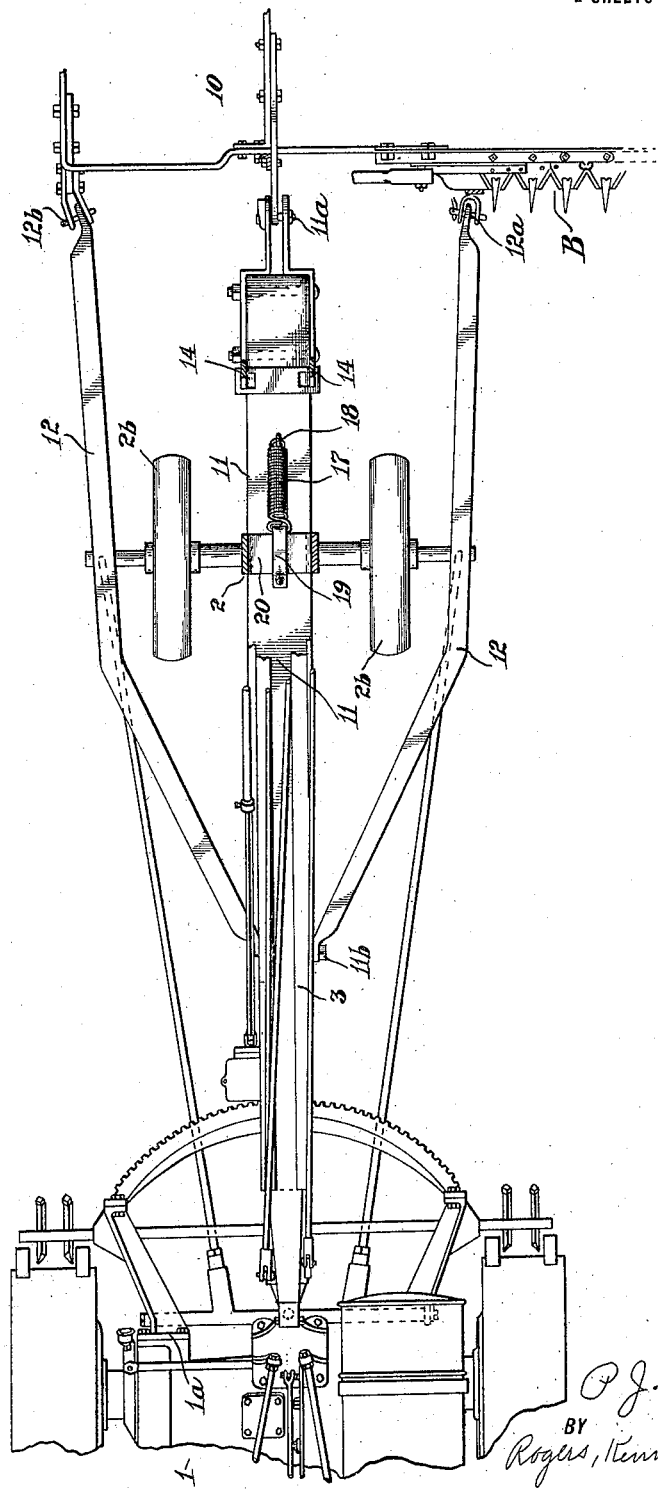

PETER J. O'CONNOR, OF POUGHKEEPSIE, NEW YORK, ASSIGNOR TO MOLINE PLOW COMPANY, A CORPORATION OF ILLINOIS.

TRACTOR CONNECTION FOR AGRICULTURAL IMPLEMENTS.

1,399,072. Specification of Letters Patent. Patented Dec. 6, 1921.

Application filed January 31, 1919. Serial No. 274,223.

*To all whom it may concern:*

Be it known that I, PETER J. O'CONNOR, a citizen of the United States, residing at Poughkeepsie, in the county of Dutchess and State of New York, have invented certain new and useful Improvements in Tractor Connections for Agricultural Implements, of which the following is a specification, reference being had therein to the accompanying drawing.

This invention relates to tractor connections for agricultural implements of the type in which the implement is coupled to the tractor to trail behind the same, and more particularly the invention relates to that type of connection employed between a tractor and a grain binder, as disclosed in applications for Letters Patent of the United States filed in the name of Isaac Trolley on the 17th day of July 1918, Serial No. 245,410, and on the 15th day of October 1918, Serial No. 245,147.

In said applications, the tractor is in the form of a power unit having a motor and two power driven traction wheels, the rear portion of the power unit being supported by a truck suitably coupled to it and so disposed as to preserve the horizontal equilibrium of the power unit, and the grain binder being connected with the truck by means of a draft member pivoted at its forward end to the truck, and pivoted at its rear end to the frame of the grain binder, so that in the passage of the tractor through the field, the binder will trail behind the same. In this mechanism, the driver occupying the usual driver's seat on the grain binder, is enabled to control the tractor by suitable controlling devices supported on the binder and extending to the tractor mechanism; and he is enabled also to adjust the height of the cutter bar of the grain binder by means of a hand lever pivotally mounted on the binder frame and connected with the draft member, the operation of the lever causing the binder frame to tip or rock on the horizontal axes of the grain and stubble wheels, thereby raising or lowering the cutter bar, as the case may be. The lever is provided with a locking latch adapted to engage the teeth of a segment frame and hold the parts in their adjusted position. The adjusting lever connected with the draft member in this manner will, when locked to the segment frame, maintain a fixed relation between the binder frame and draft member, but will not interfere with the up and down movement of the supporting truck relative to the draft member and binder in the passage of the truck over uneven ground, the truck in such movements tilting or rocking on the axis of the pivotal connection of the draft member therewith.

In the use of the apparatus in the field, it has been found that when the direction of travel of the tractor is reversed to back up the implement, the back push of the power unit against the supporting truck, causes the latter to lift or kick up at the rear relative to the draft member and binder, the truck wheels in this action leaving the ground and rising to a considerable extent, and when the tractor again advances, the truck is suddenly lowered and the wheels strike the ground with considerable violence. This action, of course, is objectionable and liable to breakage of or injury to the parts. The present invention is designed to obviate the objection, and the invention consists of means to resist this rise of the truck under the conditions mentioned and preferably arranged between the draft member and truck, and of a form and construction which, while permitting the truck to rise gradually and to a moderate extent relative to the draft member in the normal action of the parts in passing over rough ground, will resist and prevent the sudden lift of the truck to an undue extent, when the direction of travel of the tractor is reversed to back up the machine.

Referring to the drawings:

Figure 1 is a perspective view of such portions of a tractor and connected grain binding machine as will be necessary to an understanding of my invention, the same being provided with my invention.

Fig. 2 is a top plan view of the same, with certain parts removed to better show the construction.

Fig. 3 is a perspective view of a detail, showing how the resisting spring is connected with the tractor supporting truck.

Referring particularly to Figs. 1 and 2, the tractor shown comprises a power unit 1 and a supporting truck 2, the power unit having a suitable frame 1ª carrying a motor, in the present instance an internal combustion engine, and sustained by two traction wheels driven by the motor. A beam 3 is pivoted at its forward end to the frame of the power unit on a vertical axis, and extends rearwardly therefrom and is supported by the truck 2, which extends beneath the beam and gives support to the same through the medium of two vertical arms or brackets 5 and 6 depending from the beam at its front and rear respectively, and supported at their lower ends by two alined guiding bars 7 and 8 sustained by the truck, on which bars the arms may move to a limited extent back and forth and may also rock transversely. Arranged and connected in this manner, the truck supports the rear portion of the power unit of the tractor and preserves the horizontal equilibrium of the same.

The truck 2 in the present instance consists of two upright open rectangular frame members $2^a$ spaced apart from each other and connected together in fixed relations to form a unitary frame structure, the rear end of which is supported by a pair of truck wheels $2^b$ mounted thereon. The draft of the power unit is applied to the truck by means of a draft link 9 pivoted at its forward end to an arm depending from the forward end of the beam, and pivoted at its rear end between the frame members of the truck at their front.

The implement 10 to be hauled, in the present instance a grain binder, is coupled to the tractor by means of a draft member in the form of a stub pole 11, which is pivoted at its rear end to the binder frame on a horizontal axis as at $11^a$, whence it extends forwardly between the frame member of the truck and is pivoted to the same on a horizontal transverse axis as at $11^b$, two side draft bars 12 being provided, which are pivoted at their rear ends to the binder frame on horizontal axes $12^a$ and $12^b$ disposed in horizontal transverse alinement with the pivot $11^a$, and which are pivoted at their forward ends on the axis of the pivot $11^b$ connecting the stub pole with the truck.

A hand lever 13 is pivoted near its forward end as at $13^b$ to the binder frame, and extends rearwardly within reach of the driver's seat A thereon, the forward extremity of the lever having pivoted to it the upper end of two links 14, whose lower ends are pivoted as at 15 to the stub pole near its rear end, the arrangement being such that by shifting the lever on its axis, the binder frame may be caused to rock or tip on the axes of the grain and stubble wheels, and in this way raise or lower the cutter bar B, as the case may be. The lever is provided with a locking latch adapted to engage the teeth of a segment frame 16 mounted on the binder frame, by which means the parts may be locked in their adjusted positions with the binder frame in fixed relation to the stub pole. The control of the tractor is effected from the driver's seat by suitable controlling devices C, connections from which extend forwardly to the tractor mechanism. The foregoing parts are of substantially the same form and construction as those fully described in the said applications for patents above referred to, the connection of the tractor with the implement in the manner set forth, causing the implement to trail behind the tractor in the travel of the latter through the field, and enabling the truck to move up and down relative to the stub pole and implement in passing over uneven ground, while permitting the implement to be adjusted relative to the tractor to vary the height of the cutter bar.

In the operation of the mechanism in the field, it is found that when the direction of travel of the tractor is reversed to back up the implement, the push of the power unit against the truck, causes the truck to tip or kick up at its rear end relative to the stub pole and binder, the truck wheels in this action leaving the ground and rising to a considerable extent, and lifting the beam of the tractor, and when the tractor again advances, the truck descends suddenly and the wheels are brought into contact with the ground with considerable violence. To avoid this objection, I provide in accordance with my invention, a resisting means, so constructed and arranged as to resist the undue upward movement of the truck under the conditions described, but will not interfere with the gradual rise of the truck to a moderate extent in the normal operation of the parts in passing over uneven ground. This resisting means may be constructed in various forms and applied in various ways, but I prefer to adopt for this purpose, a stout coiled spring 17, shown more particularly in Figs. 1 and 3, having its upper end connected with the frame of the truck near the upper rear end of the latter, and having its lower end connected with the stub pole. This spring in the normal position of the parts as they operate in the field, exerts a downward pull on the truck and tends to hold the same yieldingly in lowered position with the wheels on the ground, and while permitting the truck to rise in passing over uneven ground, it will prevent the truck from lifting to an undue extent when the tractor is backed as above described. The lower end of the spring in the construction shown, is connected with an eye 18 fixed to the stub pole, while its upper end is hooked to a clip 19 clamped firmly to a horizontal bracket 20 fixed between the frame members of the truck at the upper rear end of the same.

It will be manifest that my invention is not limited in its application to a tractor of the detailed form and construction of that shown, nor is it limited in its application to a grain binding machine, but is applicable as well to all cases where an implement is connected with a tractor by connecting devices of such form and arrangement that the objectionable action mentioned occurs when the tractor is reversed in its travel to back up the implement.

While I have set forth and described my invention in the particular detailed form which I prefer to adopt and which in practice has been found to answer to a satisfactory degree the ends to be attained, it will be manifest that these details may be variously changed and modified without departing from the spirit of my invention; and further, it will be understood that the invention is not limited to any particular form or construction of the parts, except in so far as such limitations are specified in the claims.

Having thus described my invention, what I claim and desire to secure by Letters Patent of the United States, is as follows:

1. The combination with a front wheel drive tractor having a rearwardly extending coupling frame, of a stabilizing and connecting truck, a drawn device, a draft member pivotally connecting the drawn device with the truck so that the truck and drawn device may move relative to each other about a transverse, horizontal axis, and means coöperating with the draft member and truck serving to resiliently resist an upward movement of the truck relative to the drawn device.

2. The combination with a front wheel drive tractor having a rearwardly extending coupling frame, of a connecting truck, a drawn device pivotally connected to the truck so as to permit relative movement of the truck and device about a transverse, horizontal axis, and means for utilizing the weight of the drawn device for preventing sudden upward movements of the truck without interfering with the normal relative movement between the truck and drawn device occasioned by travel over uneven ground.

3. In combination with a tractor having a connected truck, an implement, a draft member pivoted to the implement and truck to permit the truck to move upwardly relatively to the implement in passing over uneven ground, and a member connected with the truck and draft member respectively, and acting to hold the truck yieldingly against upward relative movement.

4. In combination with a tractor having a connected supporting truck, an implement, a stub pole pivoted to the implement and truck respectively, and a spring connected at its upper end to the truck and at its lower end to the stub pole, and acting to pull down on the truck.

In testimony whereof, I have affixed my signature hereto.

PETER J. O'CONNOR.